Patented May 3, 1932

1,856,606

UNITED STATES PATENT OFFICE

MARK WALKER, OF SOUTH PASADENA, CALIFORNIA, ASSIGNOR TO THE PACIFIC R. & H. CHEMICAL CORPORATION, OF LOS ANGELES, CALIFORNIA, A CORPORATION OF CALIFORNIA

STABILIZATION OF LIQUID HYDROCYANIC ACID

No Drawing. Application filed March 30, 1929. Serial No. 351,466.

This invention has for its object the stabilization of hydrocyanic acid.

Liquid hydrocyanic acid is a colorless liquid of very low viscosity and density, boiling at about 26.5° C. When stored without treatment it changes color after a few days or a few weeks, depending upon conditions, passing through the various shades from faint amber to dark opaque brown and finally becoming solid with release of gaseous by-products, including ammonia. This reaction may be considered as substantially a polymerization of hydrocyanic acid accompanied by some decomposition. It is thought in general to be promoted by the decomposition products produced during the reaction, and by the presence of impurities such as alkaline substances. The nature of the solid end-product is not thoroughly understood. This reaction is exothermic and also is accelerated by an increase in temperature. Hence, under conditions where the radiation of heat is less than its generation, the reaction becomes progressively accelerated. When this occurs in a sealed container the pressure may be very quickly increased to as high as 1000 pounds per square inch within a few seconds. This rapid increase of pressure often causes sealed containers of hydrocyanic acid to explode. Such an explosion is more dangerous to human life than the ordinary explosion, because of the poisonous nature of the hydrocyanic acid vapors released at the same time.

Hydrocyanic acid has heretofore been stabilized by the use of small amounts of mineral acids, such as sulfuric acid, which have been only partially effective in prolonging the period of stability. Such stabilizers cannot be depended upon to preserve liquid hydrocyanic acid under conditions prevailing with common carriers and warehouses.

I have discovered that sulfur dioxide, when contacted with hydrocyanic acid, has a better stabilizing effect than that of any acids with which I am familiar. Test samples of liquid hydrocyanic acid stabilized by this reagent have stood in sealed containers at a temperature in excess of any prevailing in common carriers or storehouses, namely approximately 50° C. for more than five years without decomposition of a single sample. The results of numerous experiments indicate that the storage of hydrocyanic acid at 50° C. for five years is equivalent to keeping it twenty-five years at 20° C. Furthermore, sulfur dioxide has an advantage over practically all other stabilizers in that it penetrates and stabilizes the gaseous as well as the liquid phase of the hydrocyanic acid. This is an important function, since it is probable that one cause for the failure of known acid stabilizers has been due to their low vapor pressures, which prevent their entering and stabilizing the vapor phase. The high vapor pressure of sulfur dioxide insures a sufficient concentration of this substance in the vapor phase to effect stabilization of the vapor as well as of the liquid.

I am aware that cyanogen chloride, a substance having an appreciable vapor pressure, has been proposed as a stabilizer for liquid hydrocyanic acid. However, the properties of cyanogen chloride make it less suitable than sulfur dioxide as a stabilizer for the vapor phase. This is because its vapor pressure is lower than that of sulfur dioxide, and also because there is a tendency for its vapor pressure to progressively decrease, due to the formation of a solid polymer.

Moreover, the use of cyanogen chloride is impracticable because of: (a) its high cost, (b) the difficulty in obtaining it in large quantity, (c) its injurious effects on the foliage of plants, (d) hazards to the health of workmen handling it, because of its extremely poisonous nature, and (e) its corrosive action on metals. Sulfur dioxide has none of these objectionable qualities. It is true that sulfur dioxide has a slight corrosive action on metals in the presence of water, but it is very small compared to that of cyanogen chloride.

My preferred process consists in first adding a small amount, for instance, 0.005% by weight, of sulfuric acid. Its purpose is to neutralize any basic substances present. I then add sulfur dioxide, in the form of either liquid, compressed gas, or aqueous solution. I may, for instance, add 0.05% to 0.5% by weight of sulfur dioxide; but I have found that the amount used is immaterial so long as there is an excess over and above that required for any reaction of $SO_2$ with impurities, such as hydrogen sulfide. This invention is not restricted to the use of any definite proportion of sulfur dioxide.

This invention is not restricted to the use of any particular proportion of sulfuric acid; but it is believed that the best practice is to use less of this acid than of the sulfur dioxide.

I have disclosed in U. S. P. 1,571,982 issued to me, the purification of hydrocyanic acid by treating it with sulfur dioxide in amounts which will remove the hydrogen sulphide present. However, the present process is directed to treating a product free of $H_2S$ or its reaction products with sulfur dioxide. For the sake of brevity the term "$H_2S$-free hydrocyanic acid" is used in the claims to designate hydrocyanic acid which does not contain hydrogen sulfide and which has not been treated for the removal of hydrogen sulfide.

Wherever in the specification or claims, I refer to hydrocyanic acid, I mean either the chemically pure or the commercial product, and either hydrous or anhydrous hydrocyanic acid.

I claim:

1. The process of stabilizing $H_2S$-free hydrocyanic acid by mixing and maintaining said acid in contact with sulfur dioxide.

2. The process of stabilizing $H_2S$-free liquid hydrocyanic acid which comprises adding a small amount of sulfuric acid and thereafter mixing and maintaining said hydrocyanic acid in contact with sulfur dioxide.

3. The process of stabilizing liquid hydrocyanic acid which comprises adding 0.005% of sulfuric acid and thereafter adding 0.05% to 0.5% of sulfur dioxide, in addition to the amount of sulfur dioxide required to react with impurities in the hydrocyanic acid.

4. The process of stabilizing liquid hydrocyanic acid which comprises adding sufficient sulfur dioxide to react with impurities and thereafter adding 0.05% to 0.5% of sulfur dioxide.

5. As a new article of manufacture, liquid hydrocyanic acid containing sulfur dioxide and free from the products of reaction between hydrogen sulfide and sulfur dioxide.

6. As a new article of manufacture, liquid hydrocyanic acid containing sulfuric acid and sulfur dioxide and free from the products of reaction between hydrogen sulfide and sulfur dioxide.

7. As a new article of manufacture, liquid hydrocyanic acid containing 0.05% to 0.5% of sulfur dioxide and free from the products of reaction between hydrogen sulfide and sulfur dioxide.

8. As a new article of manufacture, liquid hydrocyanic acid containing stabilizing amounts of sulfur dioxide and free from the products of reaction between hydrogen sulfide and sulfur dioxide.

9. As a new article of manufacture, liquid hydrocyanic acid containing 0.005% of sulfuric acid and 0.05% to 0.5% of sulfur dioxide and free from the products of reaction between hydrogen sulfide and sulfur dioxide.

Signed at South Pasadena, in the county of Los Angeles and State of California, this nineteenth day of March, A. D. 1929.

MARK WALKER.

CERTIFICATE OF CORRECTION.

Patent No. 1,856,606.                                                  May 3, 1932.

MARK WALKER.

It is hereby certified that error appears in the printed specification of the above numbered patent requiring correction as follows: Page 2, line 5, strike out the comma and words ", such as hydrogen sulfide"; and that the said Letters Patent should be read with this correction therein that the same may conform to the record of the case in the Patent Office.

Signed and sealed this 12th day of July, A. D. 1932.

(Seal)                                                              M. J. Moore,
Acting Commissioner of Patents.